April 20, 1965 R. W. CHRISTENSEN 3,178,728
SURGICAL PROSTHESIS FOR THE TEMPOROMANDIBULAR JOINT
Filed Oct. 22, 1962 2 Sheets-Sheet 1
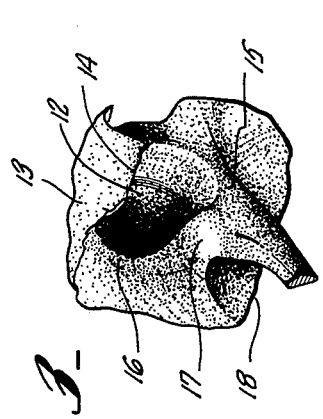
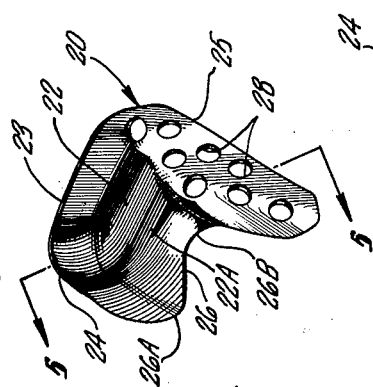
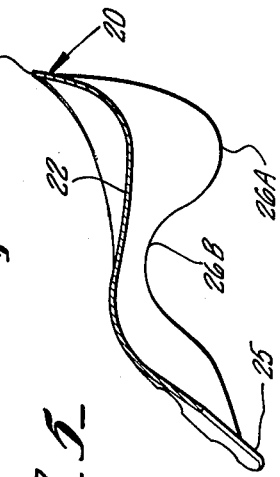
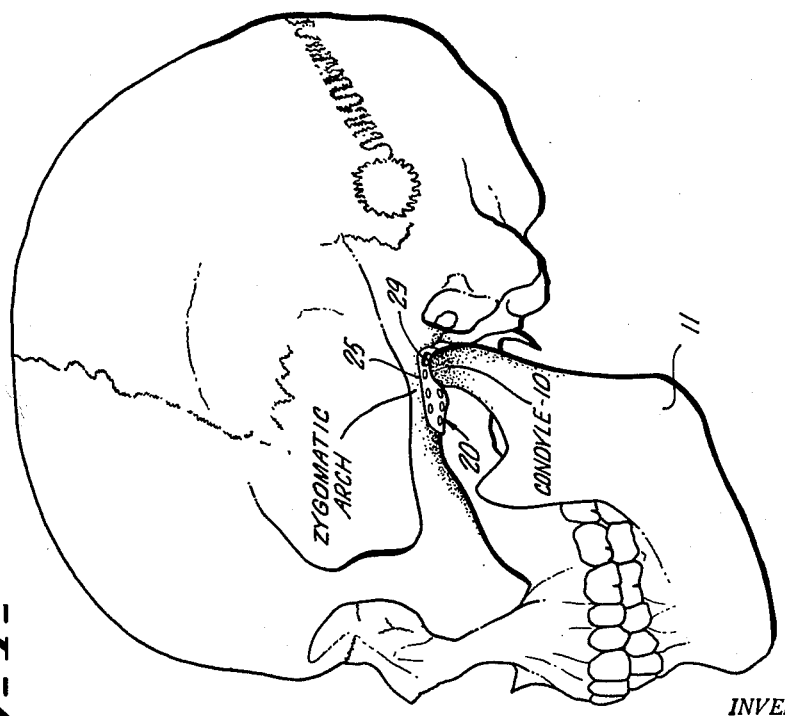
INVENTOR.
ROBERT W. CHRISTENSEN
BY
*Christie, Parker & Hale*
ATTORNEYS.

April 20, 1965 R. W. CHRISTENSEN 3,178,728
SURGICAL PROSTHESIS FOR THE TEMPOROMANDIBULAR JOINT
Filed Oct. 22, 1962 2 Sheets-Sheet 2
FIG_2_
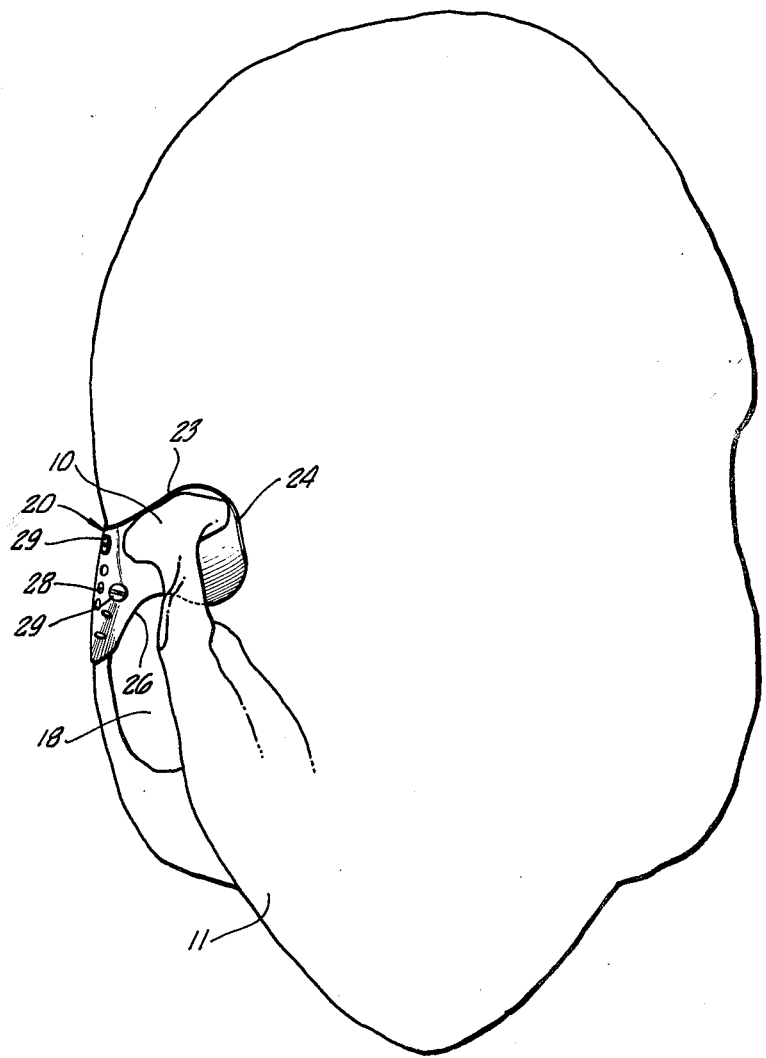
INVENTOR.
ROBERT W. CHRISTENSEN
BY
*Christie, Parker & Hale*
ATTORNEYS.

United States Patent Office 3,178,728
Patented Apr. 20, 1965

3,178,728
SURGICAL PROSTHESIS FOR THE TEMPORO-MANDIBULAR JOINT
Robert W. Christensen, 1700 E. Altadena Drive, Altadena, Calif.
Filed Oct. 22, 1962, Ser. No. 231,925
3 Claims. (Cl. 3—1)

This invention relates to the field of oral surgery and particularly to a prosthesis for restoration of a malfunctioning temporomandibular joint.

Degenerative mandibular joint conditions are of frequent occurrence, physiological causes of which are many and varied and need not be examined for an understanding of this invention. Of principal concern is fibrous or osseous ankylosis which comprises respectively a fibrous or bony fusion of the joint which may or may not be accompanied by rupture of the articular disc. Patients may in fact be unaware of the early stages of mandibular joint degeneration until perforation or even maceration of the articular disc has occurred and early changes in the bony articular surfaces of the joint have begun. However, as this degeneration progresses to total fusion, the joint becomes less and less mobile, more and more painful and, in the final stages, may become completely frozen to the extent of precluding any opening whatsoever between the teeth.

The mandibular joint is composed of the condyle extremity of the mandible and the glenoid fossa formed in the temporal bone and constituting respectively the ball and socket portions of the normally depicted joint structure. These two portions of the joint are separated as noted above by the articular disc and, in the degeneration of the joint to complete immobility and dependent upon the factors which have produced such degeneration, this disc may or may not be destroyed. In those cases where surgery has been attempted as a cure for ankylosis of this joint, it has taken the form of either a high condylectomy for fibrous ankylosis or an osteoarthrotomy for osseous ankylosis. The first of these techniques involves removal of an upper portion of the condyle to in effect destroy the joint structure, permitting a certain freedom of motion simply by the free suspension of the mandible by the attaching tissues or muscles; at best a temporary expedient, since frequently the jaw will be pulled out of shape as a result of this unnatural degree of freedom, and the same or more serious difficulties will result. Osteoarthrotomy involves performing a cut through the bone in the area of the obliterated joint fused by solid bone. This may, and is hoped, will allow a false joint to form.

I have now devised and successfully used in several cases a prosthesis for the temporomandibular joint comprising a plate of physiologically inert material and anatomically contoured to fit within the glenoid fossa and to overlay the articular eminence. To hold this plate in position within the glenoid fossa, it is provided with a lateral lip extending superiorly and engaging along a lateral surface of the zygion. By providing holes in this lateral lip, the plate may be screwed to the zygion with suitable screws.

As noted above, most attempts at correcting mandibular joint arthroses through surgical intervention have been focused on attempting to restore a lost condyle or to cover the condylar stump with a non-anatomic barrier. The present prosthesis differs from these prior efforts in that the intervention is by means of an anatomically contoured plate which is placed against the base of the skull and retained within the glenoid fossa where the significant lateral pressures to which the mandible is subjected can be easily withstood by the prosthesis.

The invention will be described in detail in conjunction with the accompanying drawings, in which:

FIG. 1 is a side elevation of a human skull showing the prosthesis of the invention in place;
FIG. 2 is a bottom view of the same skull;
FIG. 3 is a perspective view of the glenoid fossa unobstructed by the mandible;
FIG. 4 is a perspective view of the preferred form of prosthesis in accordance with the invention; and
FIG. 5 is a section taken on the line 5—5 of FIG. 4.

Referring first to FIGS. 1, 2 and 3, and specifically those parts of the skull which are involved in the practice of the present invention, the structure of the mandibular joint involves the extension of the condyle portion 10 of a mandible or lower jaw 11 into the glenoid fossa 12. It is difficult to see or illustrate the glenoid fossa with the mandible in position, and accordingly FIG. 3 is a perspective view of this portion of the skull with the mandible removed. The glenoid fossa is a cup-shaped area as illustrated, defined along its rearward extremity by the tympanic bone 13, the fossa and the tympanic bone being joined at the so-called temporotympanic fissure 14. The lateral portion of the fossa 12 is formed and defined by the zygion 15. The medial aspect of the fossa is formed by the medial glenoid ridge 16 and the anterior aspect by the articular eminence 17. The articular eminence 17 merges with the medial aspect of the zygion to define the posterior boundary of the temporal fossa 18, through which the temporal muscle passes. Together with the articular disc (not shown), the condyle of the mandible and the glenoid fossa as described constitute the temporomandibular joint with which this invention is specifically concerned.

The particular prosthesis of the invention is shown in position in FIGS. 1 and 2 and in detail in FIGS. 4 and 5. The device is illustrated in its preferred form as a metallic plate anatomically contoured to include an artificial fossa portion 22 which preferably is highly polished and, as shown in FIG. 1, receives the condyle in the same fashion as the normal glenoid fossa. Where the articular disc has been damaged in the degeneration of the joint, it may necessarily be removed, and the condyle, as shown in FIGS. 1 and 2, is housed directly within the artificial fossa. If the articular disc is sound, it may be left in place between the condyle and artificial fossa.

In the prosthesis 20, the artificial fossa 22 is defined by a posterior rim 23, a medial rim 24, a lateral rim 25 and an anterior rim 26. The posterior rim projects from about ⅛ to about ½ inch inferiorly of the fossa surface and preferably sufficiently to cover a part of the tympanic bone so as to protect the temporotympanic fissure and to inhibit post-operative adhesions between the condyle and the tympanic bone. The medial rim 24 smoothly joins the posterior rim and likewise projects inferiorly to cover the medial aspect of the glenoid fossa and the articular eminence. The medial rim is not a necessary aspect of the prosthesis but is helpful and should project from about ⅛ to about ⅜ inch from the artificial fossa. The anterior rim 26 is from about ⅛ to about ¾ inch in major dimension, this representing the dimension between the apex 26A and the anterior ridge 22A of the fossa. The anterior rim projects anteriorly and obliquely superiorly to protect the articular eminence 17 and is relieved at 26B to conform to the junction of the zygion and articular eminence, thus leaving the temporal space 18 unobstructed.

The lateral rim 25 extends superiorly from about 1/16 to ½ inch and is shaped to fit along the lateral extension of the zygion. This surface is provided with one or more perforations 28 by means of which the prosthesis 20 may be attached to the zygion, as by one or more screws 29 (see FIG. 1).

The prosthesis 20 may be made of any anatomically inert material which classically includes vitallium, surgical steels and tantalum, which are known as surgical alloys, as well as certain plastics, such as Teflon, acrylics, and polyethylene.

The surfaces of the prosthesis that will be exposed to the condyl including the artificial fossa 22, the anterior ridge 22A, the anterior rim 26, medial rim 24 and the posterior rim 23, are preferably polished to present a minimum of friction to motion of the condyle in the prosthesis. The other surfaces are preferably not polished and may even be slightly roughened, as by sandblasting, to promote tissue adherence.

I have found in the examination of a large number of skulls and in the use of the prosthesis on several patients, that the region of the glenoid fossa varies somewhat from skull to skull within certain limits. For surgical application of the prosthesis, therefore, it is preferable to have approximately ten to fifteen units available of somewhat differing shapes and sizes, all within the parameters discussed above. Radiographically, before surgery, it is generally possible to define the area of intervention sufficiently well to permit preselection of a smaller number of units, so that at the time of surgery perhaps only three or four need be tested to select the one most closely approximating anatomical contour for the particular subject.

In cases of joint arthrosis or fibrous ankylosis, normal surgical procedures are used to gain access to the area, the condyle and glenoid fossa are separated, the articular disc may be removed if damaged, and the proper prosthesis is readily inserted between the condyle and the existing fossa structure. The surgical techniques of intervention will vary with different surgeons and form no part of this invention.

In cases of osseous ankylosis, the procedure needs to be varied slightly because the loss of the normal anatomic contour of the joint. In this case it is necessary to cut through the bone below the normal glenoid fossa and made a new receptacle for the prosthesis at the level of the articular eminence. By using the articular eminence as a point of reference, one can be sure not to perforate the cranial cavity. There are many refinements in this surgical technique outside the scope of this discussion. For a more thorough treatment of the subject, reference is had to an article appearing in American Journal of Orthopedics, January 1963 edition, volume 5, No. 1, entitled The Correction of Mandibular Ankylosis by Arthroplasty and the Insertion of a Cast Vitallium Glenoid Fossa—a New Technique, by R. W. Christensen.

I claim:

1. A prosthesis for the temporomandibular joint comprising a rigid plate of physiologically inert material including a concave central portion contoured to fit within the glenoid fossa, an anterior lip extending from the central portion and shaped to overlay the articular eminence, and a projecting rim extending superiorly from the lateral aspect of the central portion to lie along a portion of the zygion, the rim providing means in cooperation with the zygion for anchoring the prosthesis to the skull with the central portion thereof disposed within the glenoid fossa.

2. A prosthesis according to claim 1 wherein the concave portion contoured to fit within the glenoid fossa is highly polished.

3. A prosthesis for the temporomandibular joint comprising a rigid plate of physiologically inert material including a concave central portion contoured to fit within the glenoid fossa, a rim projecting inferiorly from the posterior extremity of the central portion and adapted to cover and protect the temporotympanic fissure when the central portion is located within the glenoid fossa, a lip extending obliquely from the anterior extremity of the central portion to cover the articular eminence, and a projecting rim extending superiorly from the lateral aspect of the central portion for engagement along the zygion and providing means in cooperation with the zygion for anchoring the prosthesis to the skull with the central portion thereof disposed within the glenoid fossa.

References Cited by the Examiner

UNITED STATES PATENTS 2,910,978  11/59  Urist _____ 128—92
3,140,712  7/64   Hunter _____ 128—92

OTHER REFERENCES

Journal of Bone and Joint Surgery, vol. 28, 1946, pp. 603–606.

RICHARD A. GAUDET, *Primary Examiner.*